United States Patent [19]

Homeier

[11] 4,128,621

[45] Dec. 5, 1978

[54] PRODUCTION OF AMMONIA

[75] Inventor: Edwin H. Homeier, Maywood, Ill.

[73] Assignee: UOP Inc., Des Plaines, Ill.

[21] Appl. No.: 846,852

[22] Filed: Oct. 31, 1977

Related U.S. Application Data

[63] Continuation-in-part of Ser. No. 736,687, Oct. 28, 1976, abandoned.

[51] Int. Cl.$^2$ ................................................ C01C 1/04
[52] U.S. Cl. .............................. 423/362; 252/431 N; 423/363
[58] Field of Search ................. 423/362, 359–361, 423/363; 252/431 N, 431 R

[56] References Cited

U.S. PATENT DOCUMENTS

| | | |
|---|---|---|
| 3,108,081 | 10/1963 | Gleim et al. ................. 252/431 N |
| 3,148,156 | 9/1964 | Henry ........................ 252/431 N X |
| 3,230,180 | 1/1966 | Larson ........................ 252/431 N |
| 3,289,334 | 11/1966 | Kropp ........................ 252/431 N |
| 3,658,721 | 4/1972 | Tamaru ........................... 423/363 |

*Primary Examiner*—Edward J. Meros
*Attorney, Agent, or Firm*—James R. Hoatson, Jr.; Raymond H. Nelson; William H. Page, II

[57] ABSTRACT

Ammonia may be produced by the catalytic reaction of nitrogen and hydrogen, said reaction being effected in the presence of an activated transition metal macrocyclic compound. The catalyst is exemplified by cobalt phthalocyaninetetrasulfonate which has been activated by the application of a reductive potential in the range of from about -1.0 to about -3.0 volts, an example of this being by treatment with sodium borohydride. If so desired, the reaction may be effected in an inert solvent such as a paraffin, alcohol, etc.

9 Claims, No Drawings

PRODUCTION OF AMMONIA

CROSS-REFERENCE TO RELATED APPLICATIONS

This application is a continuation-in-part of my co-pending application Ser. No. 736,687 filed Oct. 28, 1976, now abandoned all teachings of which are incorporated herein by reference thereto.

BACKGROUND OF THE INVENTION

In the past ammonia which is an important chemical has been prepared by the destructive distillation of coal. More recently, ammonia has been prepared by the direct combination of nitrogen and hydrogen gases. The direct combination of hydrogen and nitrogen gases has been effected at high temperatures and pressures, pressures ranging up to about 1000 atmospheres and temperatures up to about 700° C. having been employed. However, the use of such high temperatures and pressures necessitates the use of special chromium alloy steels and reaction vessel designs. The hydrogen which is utilized in the reaction may be obtained by reaction of natural gas with steam at high temperature, by the water-gas process, or by the oxidation of natural gas to carbon monoxide and hydrogen. In addition, the hydrogen which is utilized may also be obtained as a by-product from certain petroleum refinery processes. The other reactant, namely, nitrogen, is usually supplied by admixing a sufficient amount of air with the hydrogen stream so that after combustion all oxygen is removed thus leaving the hydrogen and nitrogen in proper proportions.

The carbon monoxide which is usually present in this type of reaction may be converted to carbon dioxide by reaction with steam over an iron oxide catalyst. Following this, the carbon dioxide is then absorbed in water under pressure or with a solution of an alkanol amine such as ethanol amine which can then be continuously regenerated.

The synthesis of ammonia utilizing certain catalytic compositions of matter is known in the prior art. For example, U.S. Pat. No. 3,658,721 discloses the use of alkali-metal transition metal phthalocyanines as catalysts for the synthesis of ammonia from nitrogen and hydrogen. However, these catalysts are characterized in that they consist of electron donor-acceptor complexes or charge transfer complexes in which the transition metal phthalocyanines or porphyrins are electron acceptors and the alkali metals and organo-alkali metal compounds are electron donors. This is in contrast to the catalyst of the present application in that the catalysts of the present application do not require the presence of an alkali metal. Another difference is that the catalysts of the prior art are not activated by reduction as are the catalysts of the present invention.

As will hereinafter be set forth in greater detail, it has now been discovered that hydrogen and nitrogen may be reacted in the presence of certain catalysts at relatively low temperatures and pressures to produce ammonia.

This invention relates to a process for the production of ammonia. More specifically the invention is concerned with a process for reacting hydrogen and nitrogen in the presence of certain catalytic compositions of matter to produce the desired ammonia utilizing reaction conditions which include relatively mild conditions of temperature and pressure.

Ammonia is an important compound, which will find a wide variety of uses in the chemical field. For example, it is used in refrigeration, as a fertilizer, as an ingredient of mixtures or applied directly in liquid form, as an intermediate in the chemical manufacture of nitric acid, in rubber vulcanization, water treatment, nitriding of steel, oil refining, extraction of metals from ores, explosives, pesticides, rocket fuels, etc. It is therefore desirous of producing this compound in a relatively inexpensive manner. As hereinbefore set forth prior art methods for preparing ammonia have required the use of relatively expensive apparatus which must be able to withstand the relatively high temperatures and high pressures hereinbefore employed. As will be shown in greater detail, by utilizing certain catalytic compositions of matter it is possible to produce ammonia by the reaction of hydrogen and nitrogen gases at temperatures and pressures which will not require such expensive apparatus, the temperatures which are employed in the process of the present invention being from about ambient up to about 450° C. or more with correspondingly low pressures.

It is therefore an object of this invention to provide a process for the production of ammonia.

A further object of this invention is to provide a process for producing ammonia by reacting nitrogen and hydrogen gases in the presence of a catalyst comprising an activated transition metal macrocyclic compound.

In one aspect an embodiment of this invention resides in a process for the production of ammonia which comprises reacting hydrogen and nitrogen at reaction conditions in the presence of a catalyst comprising an activated phthalocyanine corrin or porphyrin of a transition metal, said catalyst having been activated prior to the hydrogen-nitrogen reaction by application of a reduction potential of from about $-1.0$ to about $-3.0$ volts, and recovering the resultant ammonia.

A specific embodiment of this invention is found in a process for the production of ammonia which comprises reacting hydrogen and nitrogen at a temperature in the range of from about ambient to about 450° C. and a pressure in the range of from 1 to about 300 atmospheres in the presence of a catalyst comprising cobalt phthalocyaninetetrasulfonate which has been activated by treatment with a reducing agent comprising sodium borohydride, and recovering the resultant ammonia.

Other objects and embodiments will be found in the following further detailed description of the present invention.

The process of the present invention in which ammonia is produced by reacting hydrogen and nitrogen gases is effected in the presence of catalysts which comprise an activated transition metal macrocyclic compound. Reaction conditions which are employed in this process will include relatively mild operating conditions such as temperatures ranging from about ambient to about 450° C. and pressures ranging from about 1 to about 300 atmospheres or more. These conditions contrast greatly with operating conditions of the prior art which involve temperatures ranging up to about 700° C. and pressures ranging up to about 1000 atmospheres or more. The operating pressures which are employed in this process are afforded by both the nitrogen and hydrogen gases. However, it is also contemplated within the scope of this invention that if relatively high operating pressures are to be employed, the nitrogen and hydrogen may constitute only a partial pressure, the remainder of said pressure being afforded by the introduction of an inert gas such as helium or argon into the reaction zone to make up the difference between the partial pressure of the reactants and the desired operating pressure.

Examples of transition metal macrocyclic compounds which are employed as catalysts in the present process after being activated by a treatment hereinafter set forth in greater detail will include the phthalocyanines, corrins and porphyrins of the transition metals such as cobalt, iron, chromium, manganese, copper, vanadium, etc. Some specific examples of these transition macrocyclic compounds will include cobalt phthalocyanine, iron phthalocyanine, chromium phthalocyanine, manganese phthalocyanine, copper phthalocyanine, vanadium phthalocyanine, cobalt phthalocyaninemonosulfonate, iron phthalocyaninemonosulfonate, chromium phthalocyaninemonosulfonate, manganese phthalocyaninemonosulfonate, copper phthalocyaninemonosulfonate, vanadium phthalocyaninemonosulfonate, cobalt phthalocyaninedisulfonate, iron phthalocyaninedisulfonate, chromium phthalocyaninedisulfonate, manganese phthalocyaninedisulfonate, copper phthalocyaninedisulfonate, vanadium phthalocyaninedisulfonate, cobalt phthalocyaninetetrasulfonate, iron phthalocyaninetetrasulfonate, chromium phthalocyaninetetrasulfonate, manganese phthalocyaninetetrasulfonate, copper phthalocyaninetetrasulfonate, vanadium phthalocyaninetetrasulfonate, chlororhodium phthalocyanine, chlororhodium phthalocyaninemonosulfonate, chlororhodium phthalocyaninedisulfonate, chlororhodium phthalocyaninetetrasulfonate, corrin or functionalized corrin complexes of the transition metals such as the cobalt (II) or cobalt (III) corrin complexes, vanadium corrin, iron corrin, cobyric acid (i.e., the natural product comprising a carboxylic acid and pentaamide of a dimethyl corrin complexed with cyanocobalt (III)), etc., cobalt porphyrin, vanadium porphyrin, iron porphyrin, chromium porphyrin, manganese porphyrin, copper porphyrin, sulfonic acid derivatives of the aforementioned porphyrins such as cobalt porphyrinmonosulfonate, cobalt porphyrindisulfonate, cobalt porphyrintetrasulfonate, vanadium porphyrinmonosulfonate, vanadium porphyrindisulfonate, vanadium porphyrintetrasulfonate, iron porphyrinmonosulfonate, iron porphyrindisulfonate, iron porphyrintetrasulfonate, chromium porphyrinmonosulfonate, chromium porphyrindisulfonate, chromium porphyrintetrasulfonate, etc.; hydrocarbyl-substituted metal porphyrins such as cobalt tetraphenylporphyrin, vanadium tetrabenzporphyrin, cobalt tetramethylporphyrin, vanadium tetraethylporphyrin, iron tetrapropylporphyrin, chromium tetrabutylporphyrin, etc. It is to be understood that the aforementioned transition metal macrocyclic compounds are only representative of the class of compounds which may be employed as catalysts and that the present invention is not necessarily limited thereto.

The aforementioned transition metal macrocyclic compounds may be activated by the application of a reduction potential of from about $-1.0$ to about $-3.0$ volts versus a standard hydrogen electrode. The reduction of the compounds is, therefore, effected by treatment with a reducing agent which possesses a sufficient reduction potential to reduce the transition metal. Inasmuch as the reduction potential would be required to effect the activation and differ depending upon the particular nature of the macrocyclic legands and the transition metal atoms which are involved, said reduction potential will vary within the range hereinbefore set forth. The activation may utilize any conventional reducing agents provided; however, the reducing agent will possess an electrochemical potential of sufficient value to effect the reduction within the range hereinbefore set forth. In addition, it is also contemplated that a chemical reducing agent may be omitted and that the activation be effected by the application of an electrochemical potential of suitable value. When utilizing a chemical reducing agent to effect the activation such reducing agents which possess a sufficient electrochemical potential will include sodium borohydride, potassium borohydride, lithium borohydride, calcium hydride, magnesium hydride, strontium hydride, sodium methylate, sodium ethylate, trimethyl aluminum chloride, triethyl aluminum chloride, tripropyl aluminum chloride, trimethyl aluminum, triethyl aluminum, tripropyl aluminum, tri-t-butyl aluminum, etc. It is also contemplated within the scope of this invention that hydrogen may be utilized to reduce the aforementioned catalyst although not necessarily with equivalent results. However, when employing hydrogen as the reducing agent, it is necessary to employ relatively high temperatures and pressures. This will, of necessity, constitute a drawback or disadvantage in effecting the reduction of the transition metal and therefore it is preferred that the other aforementioned reducing agents be employed.

In addition, if so desired, it is also considered within the scope of this invention that the transition metal macrocyclic compound may be supported on an inert solid support, examples of these supports including alumina such as alpha-alumina, gamma-alumina, eta-alumina, etc., silica, silica-alumina, silica-zirconia, silica-zirconia-alumina, silica-zirconia-magnesia, carbon, etc.

The process of this invention may be effected in any suitable manner and may comprise either a batch or continuous type operation. For example when a batch type operation is used, the transition metal macrocyclic compound which is to act as a catalyst for the reaction is placed in an appropriate apparatus which may comprise a pressure vessel such as an autoclave. Following this the reducing agent is added thereto along with, if so desired, an inert solvent such as paraffins including pentane, hexane, heptane; cycloparaffins such as cyclopentane, cyclohexane; aromatic hydrocarbons such as benzene, toluene, the isomeric xylenes, ethylbenzene, etc., or alcohols such as methyl alcohol, ethyl alcohol, isopropyl alcohol, n-propyl alcohol, t-butyl alcohol, etc. Upon completion of the reduction of the transition metal macrocyclic catalyst, the reagents comprising nitrogen gas and hydrogen gas are then charged to the reactor which has been sealed. In the event that the reaction is to be effected at temperatures greater than ambient, the vessel is heated to the desired operating temperature and maintained thereat for a predetermined period of time which may range from about 0.5 up to about 24 hours or more in duration. During the reaction the ammonia which is produced by the aforesaid reaction of hydrogen and nitrogen is withdrawn from the vessel and collected by any means known in the art such as condensation of the gas, collection of the gas in an aqueous media, etc.

It is also contemplated within the scope of this invention that the production of ammonia may be accomplished in a continuous manner of operation. When such a type of operation is to be employed, a reaction vessel which contains the desired catalyst is maintained at the proper operating conditions of temperature and pressure. The reactants comprising hydrogen gas and nitrogen gas are continuously charged to the reaction vessel as is the reducing agent of the type hereinbefore set forth and, if so desired, an inert solvent of the type previously mentioned. Upon completion of the desired residence time, the reactor effluent is continuously withdrawn and the ammonia is collected in a manner similar to that previously discussed with relation to the batch type operation.

The following examples are given for purposes of illustrating the process of the present invention in which ammonia is produced from nitrogen gas and hydrogen. However, it is to be understood that these examples are given merely for purposes of illustration and that the present invention is not necessarily limited thereto.

EXAMPLE I

In this example 1 gram of cobalt phthalocyaninetetrasulfonate along with 4 grams of sodium borohydride and 103 grams of denatured (Formula 30) alcohol were placed in an Erlenmeyer flask. Upon addition of the sodium borohydride to the cobalt phthalocyaninetetrasulfonate a dark precipitate formed. The flask was maintained at ambient temperature (about 25° C.) while a stream of nitrogen was bubbled through the flask at a pressure of 1 atmosphere. Ammonia evolution began and was maintained for a period of over 24 hours, the gas which was recovered being tested by means of odor, the formation of a deep blue copper tetraamine complex on a piece of filter paper which was moistened with copper chloride, plus the evolution of dense white fumes when the gas was tested with a drop of concentrated hydrochloric acid.

EXAMPLE II

To illustrate the necessity for the presence of an activated transition metal macrocyclic compound as a catalyst, sodium borohydride and denatured (Formula 30) alcohol were placed in a flask and nitrogen gas was bubbled through the mixture at ambient temperature and 1 atmosphere of pressure. However, there was no ammonia evolution or any gas evolution noted.

EXAMPLE III

In this example 0.5 grams of chlororhodium phthalocyaninemonosulfonate was added to the reaction mixture of Example II, that is, a mixture of the alcohol and sodium borohydride. Following this, nitrogen gas was bubbled through the reaction mixture and gas began to evolve therefrom. The ammonia evolution continued for a period of time greater than 24 hours, the presence of ammonia being detected in a manner similar to that set forth in Example I above, that is, by odor, by the formation of dense fumes of ammonium chloride in the presence of a drop of concentrated hydrochloric acid as well as the formation of the characteristic blue cupric ammonia complex on a piece of filter paper which had been moistened with a copper chloride solution.

EXAMPLE IV

In this example 2 millimoles of cobalt phthalocyanine tetrasulfonate was added to a glass lined, 850 cc, rotating stainless steel autoclave, following which hydrogen and nitrogen were admitted until a pressure of 50 atmospheres of hydrogen and 50 atmospheres of nitrogen had been attained. The reaction was effected in the autoclave under this total pressure of 100 atmospheres for a period of 72 hours. At the end of this time 0.79 millimoles of ammonia was recovered.

EXAMPLE V

To illustrate the utility of a transition metal macrocyclic compound composited on an inert support, 0.01 millimoles of cobalt phthalocyaninetetrasulfonate supported on gamma-alumina was treated with a mixture of 80 atmospheres of carbon monoxide and 80 atmospheres of hydrogen at a temperature of 80° C. for a period of 8 hours, said treatment being effected in an alcoholic medium in the autoclave of Example IV. Upon completion of the activation treatment of the catalyst and a venting of the excess gas, a mixture of hydrogen and nitrogen in an amount of 60 atmospheres of hydrogen and 20 atmospheres of nitrogen was admitted to the autoclave. The reaction was effected for 8 hours at a temperature of 150° C. At the end of the 8-hour period, it was determined that 2.8 moles of ammonia per mole of cobalt phthalocyaninetetrasulfonate catalyst was produced and recovered.

EXAMPLE VI

In this example 0.012 millimoles of chlororhodium phthalocyaninetetrasulfonate was activated for a period of 8 hours with 160 atmospheres of hydrogen at a temperature of 80° C. At the end of this period, 20 atmospheres of nitrogen and 160 atmospheres of hydrogen were admitted to the autoclave and the resultant mixture was heated to a temperature of 150° C. for a period of 16 hours. At the end of this 16-hour period, it was found that 0.028 millimoles of ammonia per 0.012 millimoles of chlororhodium phthalocyaninetetrasulfonate had been produced and recovered.

I claim as my invention:

1. A process for the production of ammonia which comprises reacting hydrogen and nitrogen at reaction conditions in the presence of a catalyst comprising an activated phthalocyanine, corrin or porphyrin of a transition metal, said catalyst having been activated prior to the hydrogen-nitrogen reaction by treatment with a reducing agent selected from the group consisting of sodium borohydride, potassium borohydride, lithium borohydride, calcium hydride, magnesium hydride, strontium hydride, sodium methylate, sodium ethylate, trimethyl aluminum chloride, triethyl aluminum chloride, tripropyl aluminum chloride, triethyl aluminum, tripropyl aluminum and tri-t-butyl aluminum.

2. The process as set forth in claim 1 in which said reaction conditions include a temperature in the range of from about ambient to about 450° C. and a pressure in the range of from about 1 to about 300 atmospheres.

3. The process as set forth in claim 1 in which said catalyst is activated by treatment with sodium borohydride.

4. The process as set forth in claim 1 in which said catalyst is activated by treatment with triethylaluminum chloride.

5. The process as set forth in claim 1 in which said activated transition metal is supported on a substantially inert solid support.

6. The process as set forth in claim 1 in which said catalyst is activated cobalt phthalocyaninetetrasulfonate.

7. The process as set forth in claim 1 in which said catalyst is activated chlororhodium phthalocyaninemonosulfonate.

8. The process as set forth in claim 1 in which said catalyst is activated cobalt phthalocyanine.

9. The process as set forth in claim 5 in which said catalyst is activated cobalt phthalocyaninetetrasulfonate supported on alumina.

* * * * *